March 29, 1949.  L. W. PREMO  2,465,923
WORK DRIVER
Filed Aug. 10, 1946  3 Sheets-Sheet 1
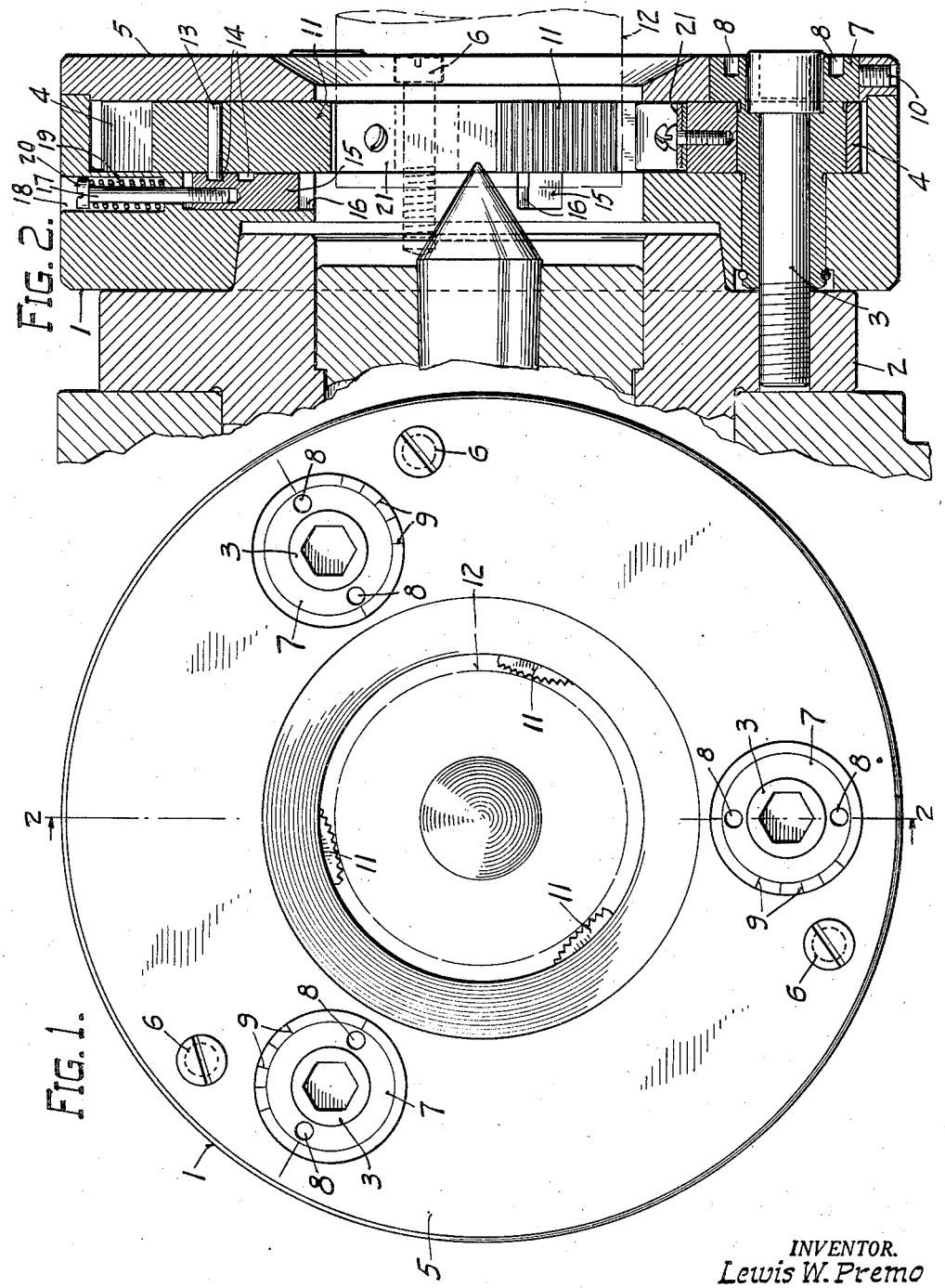
INVENTOR.
Lewis W. Premo
BY
ATTORNEY.

March 29, 1949.  L. W. PREMO  2,465,923
WORK DRIVER

Filed Aug. 10, 1946  3 Sheets-Sheet 2

INVENTOR.
Lewis W. Premo
BY
ATTORNEY.

March 29, 1949.  L. W. PREMO  2,465,923
WORK DRIVER
Filed Aug. 10, 1946  3 Sheets-Sheet 3
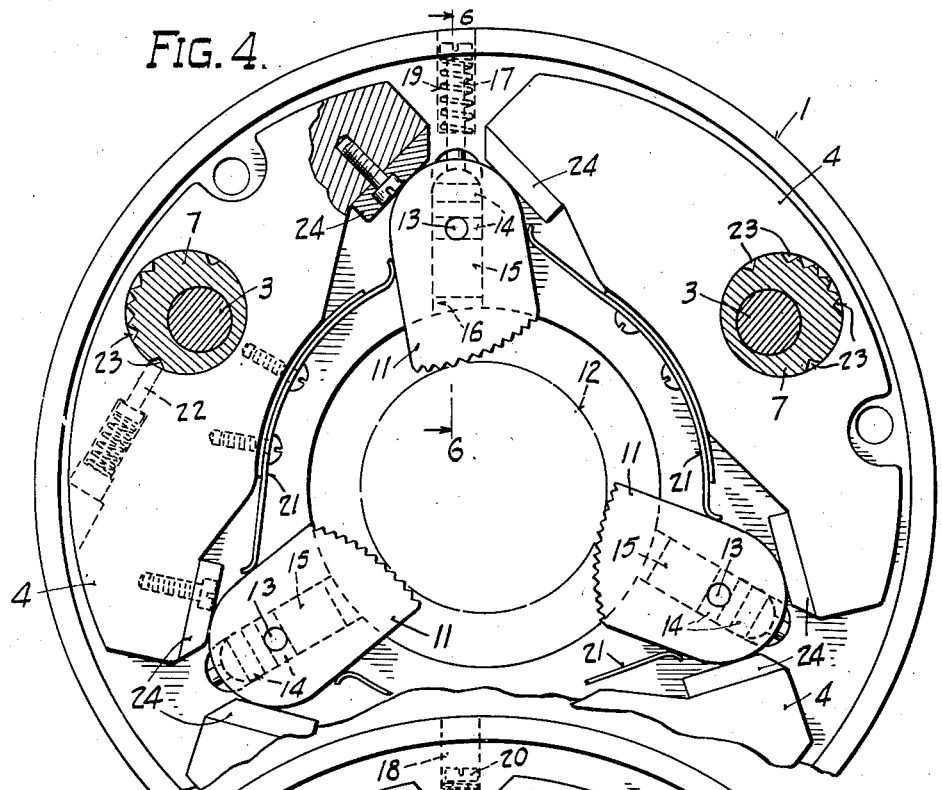
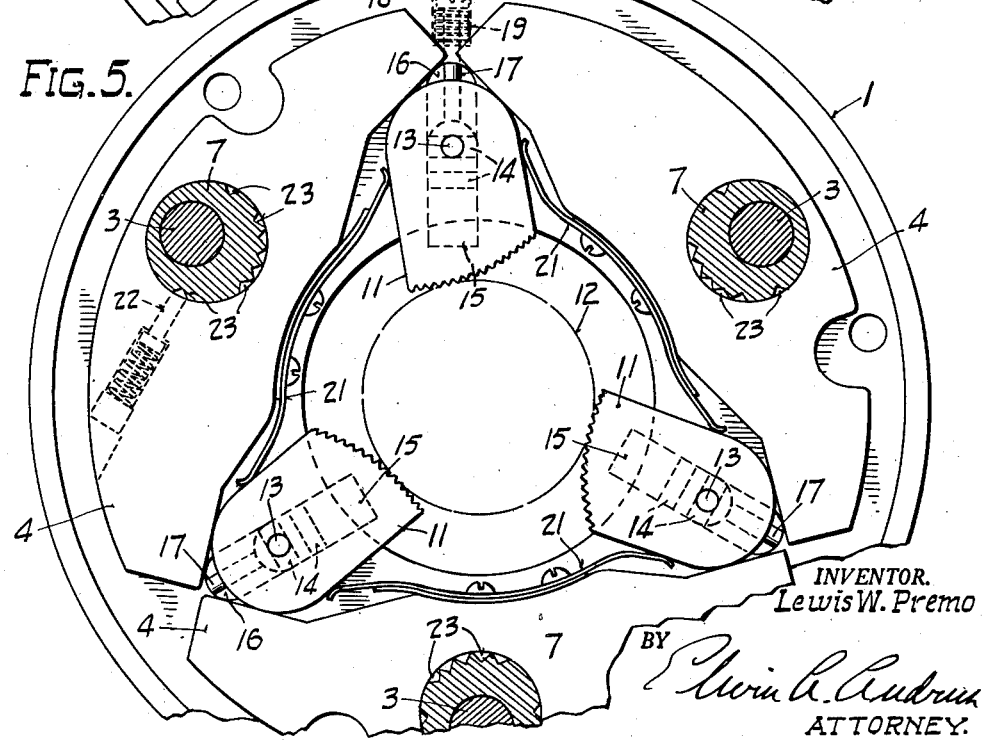
INVENTOR.
Lewis W. Premo
BY
ATTORNEY.

Patented Mar. 29, 1949

2,465,923

UNITED STATES PATENT OFFICE 2,465,923

WORK DRIVER

Lewis Wilson Premo, Madison, Wis., assignor to Gisholt Machine Company, Madison, Wis., a corporation of Wisconsin Application August 10, 1946, Serial No. 689,733

16 Claims. (Cl. 279—33)

This invention relates to an automatic work driver chuck.

One of the objects of the invention is to provide an automatic chuck which will adjust itself to off-center relations of a workpiece when the latter is held in a lathe or the like between centers.

Another object of the invention is to provide an automatic chuck having greater traction upon the work.

Another object is to provide an automatic chuck in which the frictional gripping of a workpiece is more equally distributed circumferentially thereof.

Another object is to distribute the load more equally upon the several jaws gripping the work.

Another object is to provide an automatic chuck having a wider range of adjustability to accommodate work of different diameters.

Another object is to reduce the number of additional sets of jaws necessary to accommodate work of a predetermined range of diameters.

Another object is to provide an automatic chuck which can be mounted directly upon a rotary spindle without requiring disassembly of the chuck.

Another object is to provide an automatic chuck which is balanced at all times for high speed rotation.

Another object is to reduce chucking time.

Another object is to provide an automatic chuck which is self-centering.

The chuck is adapted principally for use as a work driver or one way clutch in connection with lathes, grinders and the like.

An embodiment of the invention is illustrated in the accompanying drawings in which:

Figure 1 is a front elevation of the chuck;

Fig. 2 is a vertical axial section taken on line 2—2 of Figure 1;

Fig. 4 is a view similar to Fig. 3 showing the addition of spacers for reducing the working diameter of the chuck;

Fig. 5 is a view similar to Fig. 3 showing the rocker arm eccentrics adjusted to a different position.

Figure 3:
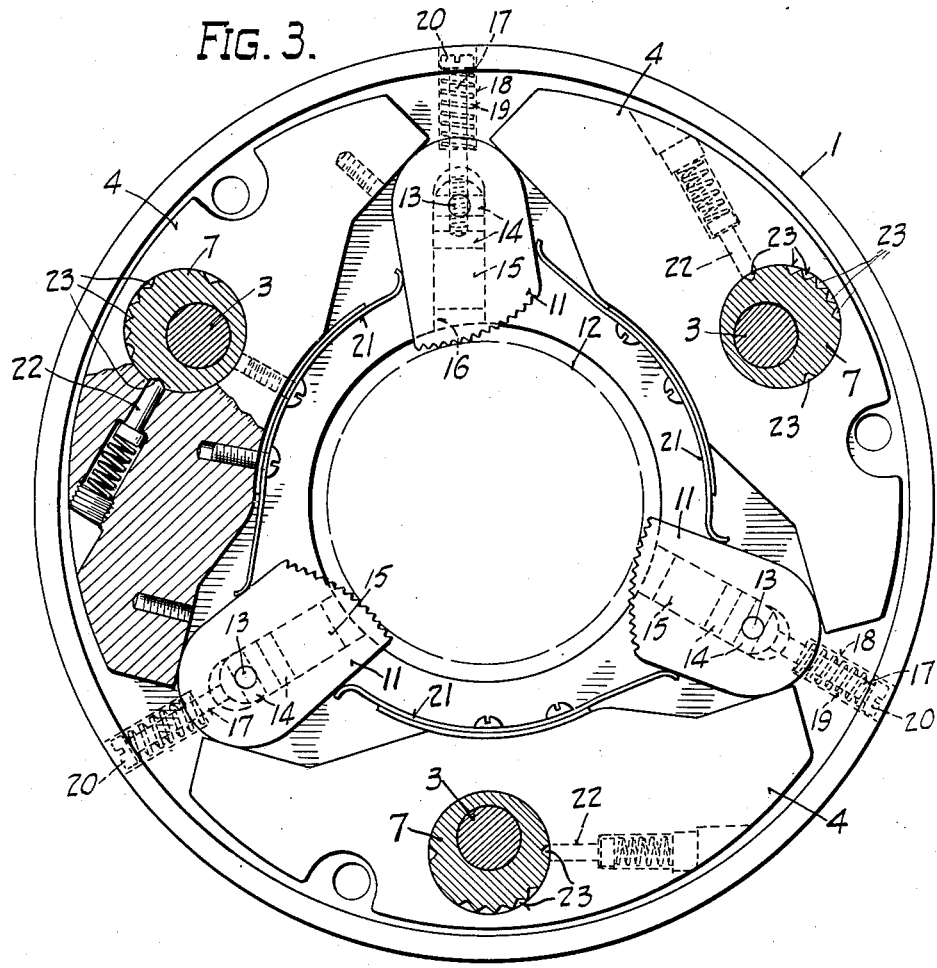
Fig. 3 is a front elevation with the cover plate removed and with parts broken away and sectioned.
Figure 6:
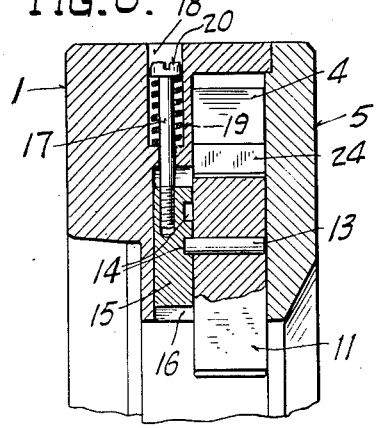
Fig. 6 is detail section taken on line 6—6 of Fig. 4.

The chuck illustrated is of the three jaw type and comprises, in general, a circular body 1 adapted to be secured to the end of a hollow rotary spindle 2 by means of the three bolts 3.

The front fact of the body 1 is recessed to receive three rocker arms or equalizer bars 4 pivotally mounted on the corresponding bolts 3.

A cover plate 5 fits over the front face of the recessed body and is held in place by screws 6.

The heads of bolts 3 are disposed in recessed pivot bushings 7 which extend outwardly through plate 5 and have spaced holes 8 therein for turning the bushings by means of a spanner wrench.

A central body portion of each bushing 7 upon which the corresponding rocker arm 4 is mounted is constructed eccentric with respect to the bolts 3, so that adjusted turning of the bushing 7 upon its bolt 3 effects a corresponding movement of the pivotal center of the rocker arm 4 relative to the center of the chuck, the bolts 3 being equally spaced from the chuck center and equally spaced circumferentially of the chuck.

There are a plurality of notches 9 constituting graduations in the circumference of the outer surface of each bushing 7 for indicating the setting of the bushing on cover plate 5.

The bushings are individually held against turning by the bolts 3 and additionally by the set screws 10 extending radially through body 1 and into engagement with the corresponding bushings.

The rocker arms 4 extend circumferentially of the chuck on opposite sides of their corresponding pivotal mountings and have their inner surfaces beveled at their ends to press against floating jaws 11.

Each jaw 11 floats in a space between the opposed ends of two adjacent rocker arms 4 and comprises a block having a semi-circular outer end bearing against the beveled surfaces of the adjacent rocker arms.

The inner end of each jaw 11 is curved eccentrically of the normal pivotal action of the jaw in a direction to effect gripping of a workpiece 12 when the chuck is turned in one direction relative to the work, and release of the workpiece when the chuck is turned in the opposite direction relative to the work.

Each jaw 11 is biased outwardly against the adjacent rocker arms 4 by means of a pin 13 extending rearwardly from the jaw into a slot or key way 14 in a jaw key 15.

The keys 15 are disposed in corresponding slots or recesses 16 in the recessed face of body 1 and extend nearly radially of the chuck.

Each key 15 is biased outwardly by a pin 17 secured to the outer end of the key and extending into a bore 18 through the rim of body 1, with a coil compression spring 19 disposed in the bore between its inner end and the outer end head 20 of the pin.

The spring biased keys 15 serve to keep the jaws 11 from dropping inward when no workpiece is present in the chuck, and serve also to keep the jaws 11 in operative position at all times.

The pins 13 serve to some extent as pivot members for the pivotal actuation of the jaws when inserting and removing a workpiece, and are disposed concentric to the semi-circular outer ends of the corresponding jaws.

The slots 16 and keys 15 are disposed offset and diagonal to a radial line of the chuck passing through the center of the corresponding pin 13 so that the longitudinal center line of each key is in alignment with the point of contact between the eccentric gripping face of jaw 11 and the work. This construction effects a gripping of the work by jaws 11 on a toggle principle and provides that the outward line of thrust upon jaws 11 will be substantially normal to the wall of the corresponding slots 16 so that pins 13 will not tend to move sideways.

Circumferential movement of the rocker arms 4 in response to adjustment of the eccentric bushings 7 does not unbalance the equalized forces applied to jaws 11 by the rocker arms or alter the alignment of keys 15 with the gripping thrust on the jaws 11.

A pair of flexible leaf spring members 21 are secured in overlapping relation on the inner surface of each rocker arm 4, and the members extend in opposite directions with the outer end of each member curved outwardly to engage and seal against the side of a corresponding jaw 11, to keep dust and dirt out of the working parts of the chuck.

Each rocker arm 4 is normally held in equalizing position relative to the two jaws 11 at its opposite ends by means of a spring pressed detent 22 adapted to seat in any one of a plurality of recesses 23 in the outer circumference of the eccentric part of bushing 7, there being a recess 23 for each operative position of the bushing.

Adjustment of the eccentric bushings 7 adjusts the radial position of rocker arms 4 and determines the radial position of jaws 11 for fitting work of predetermined diameter.

The chuck as constructed is adapted to take work varying in diameter from about nine-sixteenths of an inch to about three and nine-sixteenth inches with only three different sets of jaws, each of a different size, and with a chucking adjustment for each one-eighth of an inch in diameter change.

The eccentrics 7 have seven adjustments covering a total effective working diameter range of three quarters of an inch. An additional one quarter inch working range may be obtained by adding beveled spacer blocks 24 to the ends of the rocker arms 4, as illustrated in Fig. 4. This gives a total diameter range of one inch for each set of jaws, and three sets of jaws will provide a total working diameter range for the chuck of three inches, with some overlap for the adjustment.

The chuck automatically compensates for any irregularities in the trueness of the workpiece where the latter is centered in a lathe or the like. The chuck also equalizes the gripping forces of the jaws and provides a stronger grip of the workpiece without danger of injury to the latter.

The chuck may have various embodiments within the scope of the claims.

I claim:

1. An automatic chuck of the one way clutch type, comprising a chuck body, a plurality of equalizing rocker arms mounted on the face of said body and substantially equally spaced circumferentially thereof with their corresponding ends adjacent each other and having substantially flat working surfaces facing inwardly of the chuck, and a plurality of pivotally floating jaws disposed with one jaw between the corresponding ends of each adjacent pair of rocker arms and having curved outer working surfaces in engagement with the corresponding working surfaces of the rocker arms, each of said jaws having a gripping surface at its inner end curved on a large radius with the center of curvature offset laterally from the longitudinal center line of the jaw and being held against outward working thrust by the corresponding rocker arms.

2. An automatic chuck of the one way clutch type, comprising a chuck body, a plurality of equalizing rocker arms mounted on the face of said body and substantially equally spaced circumferentially thereof with their corresponding ends adjacent each other and having substantially flat working surfaces facing inwardly of the chuck, a plurality of pivotally floating jaws disposed with one jaw between the corresponding ends of each adjacent pair of rocker arms and having curved outer working surfaces in engagement with the corresponding working surfaces of the rocker arms, each of said jaws having a gripping surface at its inner end curved on a large radius with the center of curvature offset laterally from the longitudinal center line of the jaw and being held against outward working thrust by the corresponding rocker arms, and means for maintaining the jaws in working contact with the corresponding rocker arms at all times.

3. An automatic chuck of the one way clutch type, comprising a chuck body, a plurality of equalizing rocker arms mounted on the face of said body and substantially equally spaced circumferentially thereof with their corresponding ends adjacent each other and having substantially flat working surfaces facing inwardly of the chuck, a plurality of pivotally floating jaws disposed with one jaw between the corresponding ends of each adjacent pair of rocker arms and having curved outer working surfaces in engagement with the corresponding working surfaces of the rocker arms, each of said jaws having a gripping surface at its inner end curved on a large radius with the center of curvature offset laterally from the longitudinal center line of the jaw and being held against outward working thrust by the corresponding rocker arms, a key movable in a slot in said body behind each jaw in line with the working thrust upon the jaw, a pivotal connection between each jaw and its corresponding key, and a spring biasing each key outwardly to maintain the corresponding jaw in position against its rocker arms at all times.

4. An automatic chuck of the one way clutch type, comprising a chuck body, a plurality of equalizing rocker arms mounted on the face of said body and substantially equally spaced circumferentially thereof with their corresponding ends adjacent each other and having substantially flat working surfaces facing inwardly of the chuck, a plurality of pivotally floating jaws disposed with one jaw between the corresponding ends of each adjacent pair of rocker arms and having curved outer working surfaces in engagement with the corresponding working surfaces of the rocker arms, each of said jaws having a gripping surface at its inner end curved on a large radius with the center of curvature offset laterally from the longitudinal center line of the jaw and being held against outward working thrust by the corresponding rocker arms, a key movable longitudinally in a slot in said body behind each jaw in line with the working thrust upon the jaw and having a transverse slot in its face, a pin extending rearwardly from each jaw at substantially the center of curvature for the working surface thereof and registering in the slot of the corresponding key, and a spring biasing each key outwardly to maintain the corresponding jaw in position against its rocker arms at all times.

5. An automatic chuck of the one way clutch type, comprising a chuck body, a plurality of equalizing rocker arms mounted on the face of said body and substantially equally spaced circumferentially thereof with their corresponding ends adjacent each other and having substantially flat working surfaces facing inwardly of the chuck, a plurality of pivotally floating jaws disposed with one jaw between the corresponding ends of each adjacent pair of rocker arms and having curved outer working surfaces in engagement with the corresponding working surfaces of the rocker arms, each of said jaws having a gripping surface at its inner end curved on a large radius with the center of curvature offset laterally from the longitudinal center line of the jaw and being held against outward working thrust by the corresponding rocker arms, a key movable longitudinally in a slot in said body behind each jaw in line with the working thrust upon the jaw and having a transverse slot in its face, a pin extending rearwardly from each jaw at substantially the center of curvature for the working surface thereof and registering in the slot of the corresponding key, a spring biasing each key outwardly to maintain the corresponding jaw in position against its rocker arms at all times, and a cover plate covering the rocker arms and jaws on the face of the chuck body and preventing displacement of the parts, said cover serving to hold said jaw pins in the corresponding slots in said keys.

6. An automatic chuck of the one way clutch type, comprising a chuck body, a plurality of equalizing rocker arms mounted on the face of said body and substantially equally spaced circumferentially thereof with their corresponding ends adjacent each other and having substantially flat working surfaces facing inwardly of the chuck, a plurality of pivotally floating jaws disposed with one jaw between the corresponding ends of each adjacent pair or rocker arms and having curved outer working surfaces in engagement with the corresponding working surfaces of the rocker arms, each of said jaws having a gripping surface at its inner end curved on a large radius with the center of curvature offset laterally from the longitudinal center line of the jaw and being held against outward working thrust by the corresponding rocker arms, means for maintaining the jaws in working contact with the corresponding rocker arms at all times, and a cover plate covering the rocker arms and jaws on the face of the chuck body and preventing displacement of the parts.

7. An automatic chuck of the one way clutch type, comprising a chuck body, a plurality of equalizing rocker arms mounted on the face of said body and substantially equally spaced circumferentially thereof with their corresponding ends adjacent each other and having substantially flat working surfaces facing inwardly of the chuck, a plurality of pivotally floating jaws disposed with one jaw between the corresponding ends of each adjacent pair of rocker arms and having curved outer working surfaces in engagement with the corresponding working surfaces of the rocker arms, each of said jaws having a gripping surface at its inner end curved on a large radius with the center of curvature offset laterally from the longitudinal center line of the jaw and being held against outward working thrust by the corresponding rocker arms, and insert blocks adapted to be secured between the corresponding working surfaces of the rocker arms and jaws for adjusting the radial position of said jaws in the chuck.

8. An automatic chuck of the one way clutch type, comprising a chuck body, a plurality of equalizing rockers arms mounted on the face of said body and substantially equally spaced circumferentially thereof with their corresponding ends adjacent each other and having substantially flat working surfaces facing inwardly of the chuck, a plurality of pivotally floating jaws disposed with one jaw between the corresponding ends of each adjacent pair of rocker arms and having curved outer working surfaces in engagement with the corresponding working surfaces of the rocker arms, each of said jaws having a gripping surface at its inner end curved on a large radius with the center of curvature offset laterally from the longitudinal center line of the jaw and being held against outward working thrust by the corresponding rocker arms, means for maintaining the jaws in working contact with the corresponding rocker arms at all times, and insert blocks adapted to be secured between the corresponding working surfaces of the rocker arms and jaws for adjusting the radial position of said jaws in the chuck.

9. An automatic chuck of the one way clutch type, comprising a chuck body, a plurality of equalizing rocker arms mounted on the face of said body and substantially equally spaced circumferentially thereof with their corresponding ends adjacent each other and having substantially flat working surfaces facing inwardly of the chuck, a plurality of pivotally floating jaws disposed with one jaw between the corresponding ends of each adjacent pair of rocker arms and having curved outer working surfaces in engagement with the corresponding working surfaces of the rocker arms, each of said jaws having a gripping surface at its inner end curved on a large radius with the center of curvature offset laterally from the longitudinal center line of the jaw and being held against outward working thrust by the corresponding rocker arms, means for maintaining the jaws in working contact with the corresponding rocker arms at all times, insert blocks adapted to be secured between the corresponding working surfaces of the rocker arms and jaws for adjusting the radial position of said jaws in the chuck, and a cover plate covering the rocker arms and jaws on the face of the chuck body and preventing displacement of the parts.

10. An automatic chuck of the one way clutch type, comprising a chuck body, a plurality of equalizing rocker arms pivotally mounted on the face of said body and substantially equally spaced circumferentially thereof with their corresponding ends adjacent each other and having substantially flat working surfaces facing inwardly of the chuck, a plurality of pivotally floating jaws disposed with one jaw between the corresponding ends of each adjacent pair of rocker arms and having curved outer working surfaces in engagement with the corresponding working surfaces of the rocker arms, each of said jaws having a gripping surface at its inner end curved on a large radius with the center of curvature offset laterally from the longitudinal center line of the jaw and being held against outward working thrust by the corresponding rocker arms, and means for adjusting the radial position of said jaws in the chuck by movement of the pivotal centers of the rocker arms toward and away from the center of the chuck.

11. An automatic chuck of the one way clutch type, comprising a chuck body, a plurality of equalizing rocker arms pivotally mounted on the face of said body and substantially equally spaced circumferentially thereof with their corresponding ends adjacent each other and having substantially flat working surfaces facing inwardly of the chuck, a plurality of pivotally floating jaws disposed with one jaw between the corresponding ends of each adjacent pair of rocker arms and having curved outer working surfaces in engagement with the corresponding working surfaces of the rocker arms, each of said jaws having a gripping surface at its inner end curved on a large radius with the center of curvature offset laterally from the longitudinal center line of the jaw and being held against outward working thrust by the corresponding rocker arms, means for maintaining the jaws in working contact with the corresponding rocker arms at all times, and means for adjusting the radial position of said jaws in the chuck by movement of the pivotal centers of the rocker arms toward and away from the center of the chuck.

12. An automatic chuck of the one way clutch type, comprising a chuck body, a plurality of equalizing rocker arms pivotally mounted on the face of said body and substantially equally spaced circumferentially thereof with their corresponding ends adjacent each other and having substantially flat working surfaces facing inwardly of the chuck, a plurality of pivotally floating jaws disposed with one jaw between the corresponding ends of each adjacent pair of rocker arms and having curved outer working surfaces in engagement with the corresponding working surfaces of the rocker arms, each of said jaws having a gripping surface at its inner end curved on a large radius with the center of curvature offset laterally from the longitudinal center line of the jaw and being held against outward working thrust by the corresponding rocker arms, means for maintaining the jaws in working contact with the corresponding rocker arms at all times, means for adjusting the radial position of said jaws in the chuck by movement of the pivotal centers of the rocker arms toward and away from the center of the chuck, and a cover plate covering the rocker arms and jaws on the face of the chuck body and preventing displacement of the parts, said adjusting means extending through the face of said cover plate for ready access from the front of the chuck.

13. An automatic chuck of the one way clutch type, comprising a chuck body, a plurality of equalizing rocker arms pivotally mounted on the face of said body and substantially equally spaced circumferentially thereof with their corresponding ends adjacent each other and having substantially flat working surfaces facing inwardly of the chuck, a plurality of pivotally floating jaws disposed with one jaw between the corresponding ends of each adjacent pair of rocker arms and having curved outer working surfaces in engagement with the corresponding working surfaces of the rocker arms, each of said jaws having a gripping surface at its inner end curved on a large radius with the center of curvature offset laterally from the longitudinal center line of the jaw and being held against outward working thrust by the corresponding rocker arms, a key movable longitudinally in a slot in said body behind each jaw in line with the working thrust upon the jaw and having a transverse slot in its face, a pin extending rearwardly from each jaw at substantially the center of curvature for the working surface thereof and registering in the slot of the corresponding key, a spring biasing each key outwardly to maintain the corresponding jaw in position against its rocker arms at all times, and means for adjusting the radial position of said jaws in the chuck by movement of the pivotal centers of the rocker arms toward and away from the center of the chuck.

14. An automatic chuck of the one way clutch type, comprising a chuck body, a plurality of equalizing rocker arms mounted on the face of said body and substantially equally spaced circumferentially thereof with their corresponding ends adjacent each other and having substantially flat working surfaces facing inwardly of the chuck, a plurality of pivotally floating jaws disposed with one jaw between the corresponding ends of each adjacent pair of rocker arms and having curved outer working surfaces in engagement with the corresponding working surfaces of the rocker arms, each of said jaws having a gripping surface at its inner end curved on a large radius with the center of curvature offset laterally from the longitudinal center line of the jaw and being held against outward working thrust by the corresponding rocker arms, and eccentric pins secured to the chuck body and upon which the corresponding rocker arms are mounted for adjustment radially of the chuck to position the jaws for work of different size.

15. An automatic chuck of the one way clutch type, comprising a chuck body, a plurality of equalizing rocker arms mounted on the face of said body and substantially equally spaced circumferentially thereof with their corresponding ends adjacent each other and having substantially flat working surfaces facing inwardly of the chuck, a plurality of pivotally floating jaws disposed with one jaw between the corresponding ends of each adjacent pair of rocker arms and having curved outer working surfaces in engagement with the corresponding working surfaces of the rocker arms, each of said jaws having a gripping surface at its inner end curved on a large radius with the center of curvature offset laterally from the longitudinal center line of the jaw and being held against outward working thrust by the corresponding rocker arms, means for maintaining the jaws in working contact with the corresponding rocker arms at all times, and eccentric pins secured to the chuck body and upon which the corresponding rocker arms are mounted for adjustment radially of the chuck to position the jaws for work of different size.

16. An automatic chuck of the one way clutch type, comprising a chuck body, a plurality of equalizing rocker arms mounted on the face of said body and substantially equally spaced circumferentially thereof with their corresponding ends adjacent each other and having substantially flat working surfaces facing inwardly of the chuck, a plurality of pivotally floating jaws disposed with one jaw between the corresponding ends of each adjacent pair of rocker arms and having curved outer working surfaces in engagement with the corresponding working surfaces of the rocker arms, each of said jaws having a gripping surface at its inner end curved on a large radius with the center of curvature offset laterally from the longitudinal center line of the jaw and being held against outward working thrust by the corresponding rocker arms, means for maintaining the jaws in working contact with the corresponding rocker arms at all times, eccentric pins secured to the chuck body and upon which the corresponding rocker arms are mounted for adjustment radially of the chuck to position the jaws for work of different size, and a cover plate covering the rocker arms and jaws on the face of the chuck body and preventing displacement of the parts, said adjusting means extending through the face of said cover plate for ready access from the front of the chuck.

LEWIS WILSON PREMO.

REFERENCES CITED

The following references are of record in the file of this patent:

UNITED STATES PATENTS

| Number | Name | Date |
|---|---|---|
| 1,072,142 | Miller | Sept. 2, 1913 |
| 1,483,190 | Treulin | Feb. 12, 1924 |
| 1,770,515 | Godfriaux | July 15, 1930 |

FOREIGN PATENTS

| Number | Country | Date |
|---|---|---|
| 219,861 | Great Britain | Aug. 7, 1924 |
| 171,650 | Canada | 1916 |